United States Patent [19]

Ghandeharizadeh

[11] Patent Number: 4,840,449
[45] Date of Patent: Jun. 20, 1989

[54] OPTICAL FIBER SPLICE ORGANIZER

[75] Inventor: Shahryar Ghandeharizadeh, Hopatcong, N.J.

[73] Assignee: American Telephone and Telegraph Company, AT&T Bell Laboratories, Murray Hill, N.J.

[21] Appl. No.: 149,036

[22] Filed: Jan. 27, 1988

[51] Int. Cl.⁴ .............................................. G02B 6/36
[52] U.S. Cl. ................................................. 350/96.20
[58] Field of Search .............. 350/96.10, 96.15, 96.20, 350/96.21

[56] References Cited

U.S. PATENT DOCUMENTS

| | | | |
|---|---|---|---|
| 4,266,853 | 5/1981 | Hutchins et al. | 350/96.20 |
| 4,319,951 | 3/1982 | Korbelak et al. | 350/96.21 X |
| 4,332,435 | 6/1982 | Post | 350/96.20 |
| 4,687,289 | 8/1987 | DeSanti | 350/96.20 |
| 4,702,551 | 10/1987 | Coulombe | 350/96.21 X |

FOREIGN PATENT DOCUMENTS

| | | | |
|---|---|---|---|
| 3248003 | 6/1984 | Fed. Rep. of Germany | 350/96.20 |
| 0161513 | 12/1981 | Japan | 350/96.20 |
| 0202407 | 10/1985 | Japan | 350/96.20 |

Primary Examiner—William L. Sikes
Assistant Examiner—Phan T. Heartney
Attorney, Agent, or Firm—Jack S. Cubert

[57] ABSTRACT

An optical fiber organizer and splicing arrangement permits storage of variable lengths of surplus fiber. The organizer has a pair of separated cylinders extending from a first rectangular section of a base plate and a splice tray having opposite entrance sides for optical fiber in a second rectangular section. Each cylinder has a prescribed height permitting wrapping of multiple loops of fiber around the cylinder circumference and a diameter determined by the fiber bend radius restriction. The splicing tray is spaced from the base plate to permit passage of optical fiber underneath the splicing tray. The surplus fiber is directed around one or both cylinders and underneath the splicing tray through a plurality of different length passageways so that the varying lengths of optical fiber are stored. Clockwise, counter clockwise and figure eight loops are used so that each optical fiber end is directed to predetermined entrance side of the splicing tray without exceeding the fiber bend radius restriction.

8 Claims, 7 Drawing Sheets

OPTICAL FIBER SPLICE ORGANIZER

FIELD OF THE INVENTION

The invention relates to optical communication systems and more particularly to organizing arrangements for optical fibers used in such communication systems.

BACKGROUND OF THE INVENTION

As is well known, optical fibers provide the transmission medium for wide bandwidth lightwave communication systems. Optical fibers, however, are generally small in diameter, brittle and have transmission characteristics that are impaired by bending beyond a prescribed minimum bend radius. Consequently, it is necessary to use special handling techniques to assure reliable transmission. This is especially important in lightguide communication systems having a large number of interconnections where optical fibers must be spliced to make the needed interconnections and interconnection changes. Such interconnection splices are usually contained in enclosures designed to provide a reservoir of slack fiber to accommodate splicing changes. The splicing enclosures must maintain the required optical fiber transmission characteristics and the integrity of the plurality of fibers in the enclosure.

U.S. Pat. No. 4,266,853 discloses a device for organizing optical fibers in which a plurality of stacked traylike supports have partially turned up edges, with each support separately hinged at one side to a carrier. Each support includes a looped fiber retaining portion having a width at least equal to twice the minimum bend radius so that fiber damage can be avoided. The optical fibers, however, are restrained within the turned up edges of the tray support so that only a fixed length of fiber can be stored. Lengths deviating from the prescribed loop length are not accommodated.

Other fiber optical organizer structures are known which include one or more cylindrical structures of a diameter that assures the minimum bend radius restriction is observed. One such arrangement described in U.S. Pat. No. 4,332,435 issued June 1, 1982 to Post et al has a storage space on either side of a splicing recess. Each space has an inner diameter at least equal to twice the minimum radius of curvature of the optical fiber stored therein and bolt of a diameter to prevent bending problems. These arrangements, however, require that the lengths of stored fiber be restricted to integer multiples of a prescribed loop length when fiber lengths in excess of that needed for the splicing is stored. It is an object of the invention to provide an improved optical fiber organizer which permits storage of a wide range of fiber lengths and assures maintenance of bend radius restrictions.

SUMMARY OF THE INVENTION

The foregoing object is achieved by providing a structure having a plurality of different length passageways for optical fiber to traverse wherein each passageway is shaped to assure conformance with bend radius requirements.

The invention is directed to an optical fiber organizer having a base plate divided into first and second rectangular sections, a sidewall extending from each edge of the base plate traversing both first and second rectangular sections, and an optical fiber splice tray having a pair of opposite entrance sides for optical fiber ends. The first rectangular section of the base plate includes a pair of spaced apart cylinders extending outward a prescribed distance from the base plate. Each cylinder has a diameter equal to at least twice the minimum bend radius of the optical fiber and the splice tray is spaced from the second rectangular section of the base plate to permit passage of optical fibers between said base plate and the splice tray. The space between the cylinders, the spaces between the cylinders and the sidewalls adjacent thereto and the space between the base plate and the splice tray define a set of different length passageways for varying lengths of optical fiber. The passageway for each optical fiber is selected to direct the end of the optical fiber to a predetermined one of the opposite entrance sides of the splice tray while maintaining the minimum bend radius of the optical fiber.

DETAILED DESCRIPTION

Figure 1:
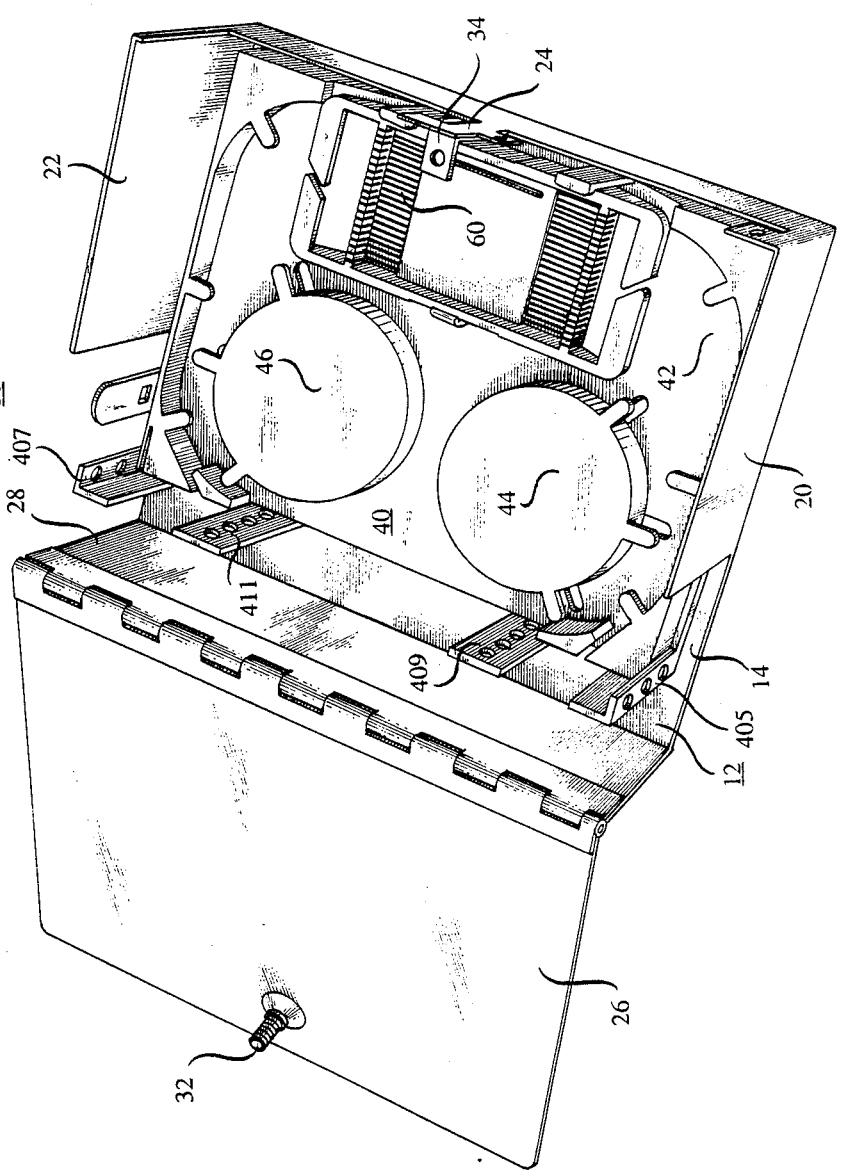
FIG. 1 is a front perspective view of a device for enclosing, organizing and splicing optical fibers in illustrative of the invention.

FIG. 1 shows a perspective view of a device 10 adapted to efficiently organize and protect optical fibers and optical fiber splices. Referring to FIG. 1, device 10 comprises housing 12 shown in open position and at least one optical fiber organizer 40. Each organizer 40 is divided into left and right sections. The left side section includes a pair of spaced cylinders 44 and 46 extending outward from a rectangular shaped base 42 and the right side section includes a splicing tray 60 spaced from the base 42 to permit passage of optical fiber therebetween. In accordance with the invention, the organizer provides a plurality of different length passageways to direct optical fibers around the spaced cylinders, between the spaced cylinders and underneath the splicing tray so that slack optical fiber of varying lengths may be stored for splicing. The stored fibers are directed through one or more of these passageways and extended therefrom into grooves in the splice tray adapted to retain spliced interconnections.

Housing 12 shown in FIG. 1 is adapted to enclose at least one organizer 40 therein. The housing includes a rectangular base 14, a structure 15 mounted on base 14 for supporting a plurality of organizers 40, side members 20 and 22 extending outwardly from the top and bottom edges of base 14, and latch post 24 extending from the right edge of base 14. Enclosure cover 26 is hinged to side member 28 on the left edge of base 14 by hinge 30 and is adapted to pivot from an open position as shown to a closed position covering the tray assembly. Latch post assembly 24 extending from the center portion of the right edge of base 14 includes an aperture 34 into which locking mechanism 32 on cover member 26 is inserted. A vertical channel is provided between left sidewall 28 of the enclosure and the organizer support structure 15 for sheathed optical fiber cable to enter the enclosure from the left top and left bottom corners thereof. Rectangular posts 409 and 411 on holding structure 15 have regularly spaced apertures therethrough for insertion of cable ties to retain optical fiber cable from which individual fibers or fiber ribbons separated from the cable are inserted into an organizer in enclosure 12.

Base plate 14 of enclosure 12 is generally affixed to a vertical surface with organizer support structure 15 mounted therein. An organizer 40 is then be pivotally fastened to support structure 15 and locked into position with its base 42 parallel to enclosure base 14. Optical fibers separated from the cable are then directed around cylinders 44 and 46 to provide slack fiber loops. The ends of the slack fiber lengths in the organizer are spliced and the splicing structure is mounted on splice tray 60.

Figure 2:
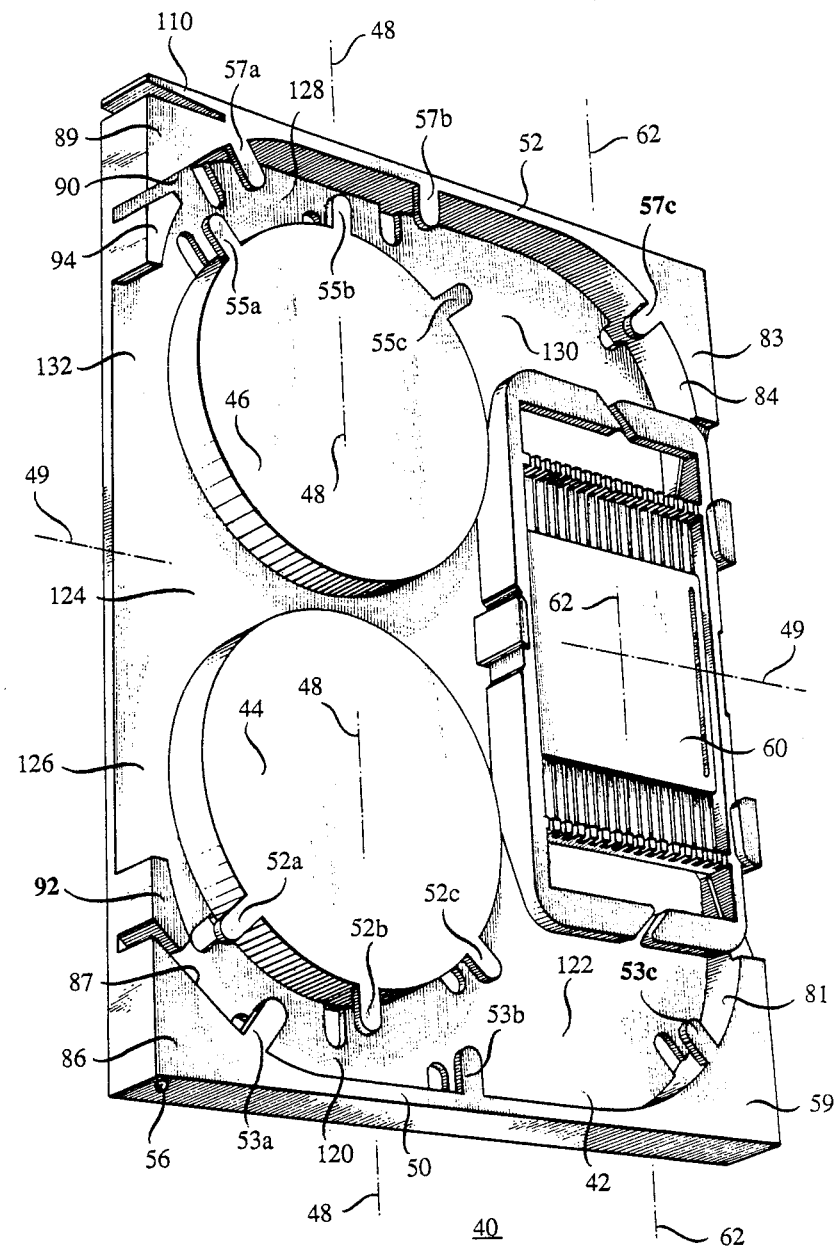
FIG. 2 is a front perspective view of an organizer of the device of FIG. 1 with a splicing tray placed therein.

FIG. 2 shows a front perspective view of organizer tray 40 removed from enclosure 12 with splice tray 60 mounted thereon. Organizer tray 40 has a rectangular shaped base 42 divided into a left portion and a right portion. Spaced cylindrical structures 44 and 46 extend outward from base 42 in the left portion to a predetermined height selected to permit placement of one or more optical fiber ribbons or individual optical fibers around the cylinders. Cylindrical structures 44 and 46 have centers along vertical line 48 equispaced from horizontal center line 49. The cylinders are spaced apart to form a channel 124 which permits passage of a plurality of individual optical fibers therebetween. The diameter of each cylinder is determined by the bending radius requirement of the optical fiber and is at least twice the minimum bend radius of the optical fiber.

Splice tray 60 in the right hand section of the organizer 40 is centered at the crossing of vertical line 62 and horizontal line 49. The back of the splice tray in FIG. 2 is fixed into position a predetermined distance from base 42 to permit passage of a plurality of optical fibers thereunder. Sidewall 50 extends outward along the bottom edge of base 42 to the same height as cylinder 44 so that a channel 120 is defined between cylinder 44 and the sidewall. Similarly, sidewall 52 extends from base 42 along its top edge to the same height as cylinder 46 to define a channel therebetween. Spaced fingers 52a, 52b and 52c project from the front of cylinder 44 toward sidewall 50 and fingers 53a, and 53b project from sidewall 50 toward the cylinder 44 to retain optical fibers within channel 120 between cylinder 44 and sidewall 50. In like manner, Spaced fingers 55a, 55b and 55c project from the front facing surface of cylinder 46 toward sidewall 52 and fingers 57a, and 57b project from sidewall 52 toward cylinder 46 to keep optical fibers inside channel 128 formed between cylinder 46 and sidewall 52.

Sidewall 50 includes optical fiber guide member 59 which extends around the lower right corner of base 42 to the right edge of the base. Concave surface 81 of optical fiber guide member 59 faces the interior of the organizer 40 and is adapted to guide optical fiber from the channel adjacent to sidewall 50 into the space underneath splice tray 60 so that the optical fiber is within its bend radius requirements. Finger 53c on guide 59 projects toward the interior of the organizer to keep optical fiber within the organizer. Similarly, guide member 83 on sidewall 52 in the upper right corner of base 42 has a concave surface 84 and finger 57c adapted to direct optical fiber into the region between organizer base 42 and splice tray 60 without violating bend radius restrictions. Sidewall 50 also has a corner extension 86 in the lower left corner of base 42 which includes a curved surface 87 facing cylinder 44 while corner extension 89 of sidewall 52 in the upper left hand corner of base 42 has a curved surface 90 facing cylinder 46. Optical fiber guide 92 extends from the lower left edge of base 42 in close proximity to lower left corner section 87 of sidewall 50 and guide 94 extends from the upper left edge of base 42 in close proximity to corner section 89 of sidewall 52. The channel formed between corner section 86 and guide 92 permits entry of optical fiber into organizer into the lower left side of organizer 40 while the channel between guide 94 and corner section 89 permits entry of optical fiber into the upper left side of the organizer. Fingers 53c and 57c in corner extensions 59 and 83 project toward the interior of the organizer to keep optical fibers within the prescribed height of the organizer.

Sidewall 50 in FIG. 2 includes a downward facing cylindrical pin 56 in corner section 86 and sidewall 52 includes an upward facing cylindrical pin 58 (shown in FIG. 3) in corner section 89. Pins 56 and 58 are adapted to pivotally attach the organizer to organizer support structure 15. Corner section 89 is shaped to include a partially separated wedge shaped portion which may be compressed against the main portion of section 89 to aid in attachment of the organizer to support structure 15 as will be described.

Figure 3:
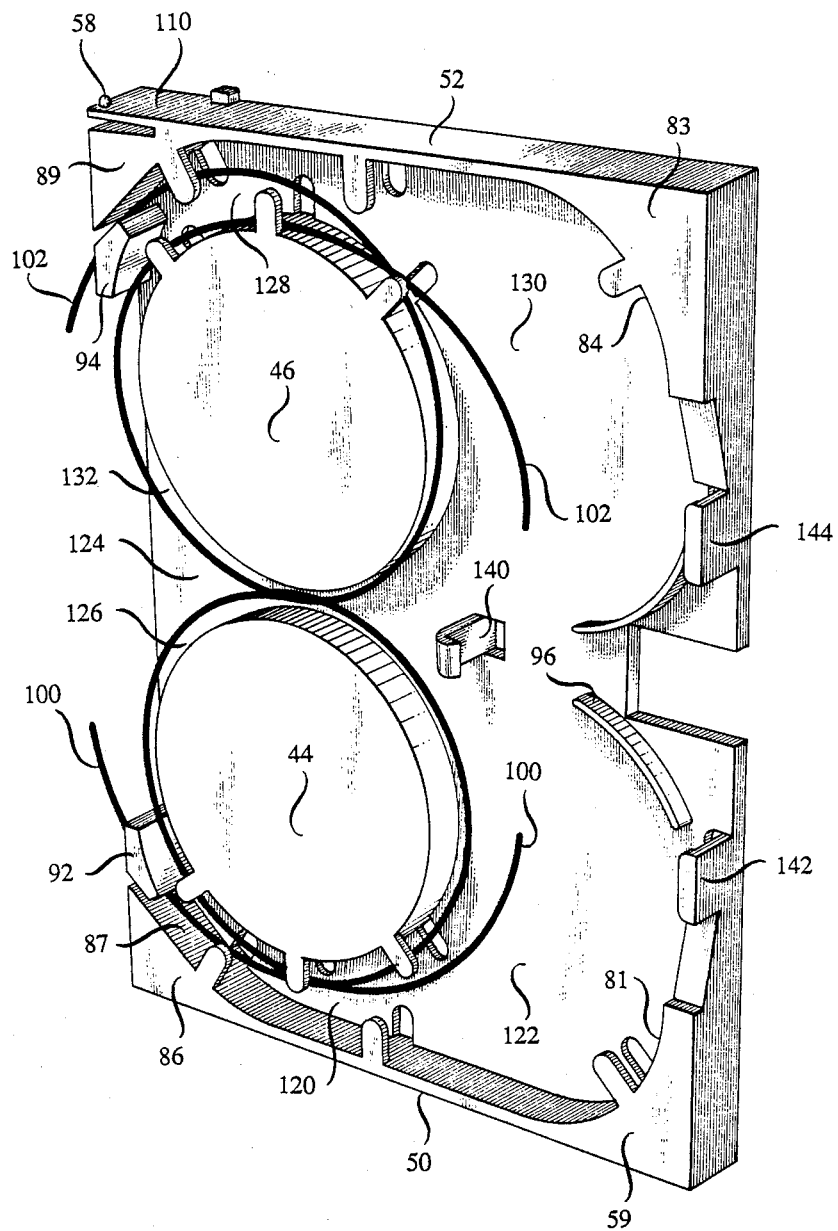
FIG. 3 is a front perspective view of the organizer of the device of FIG. 1 with the splicing tray removed.

FIG. 3 shows a perspective view from the left front of organizer with splice tray 60 removed to illustrate the placement of slack optical fiber to be spliced. In addition to the optical fiber guide structure described with respect to FIG. 2, there are two curved guide plates 96 and 97 extending outward from base 42 underneath splice tray 60 shown in FIG. 2. Guide plate 96 is curved to direct optical fiber from the lower right side of organizer 40 into channel 124 between cylinders 44 and 46 while guide member 97 is curved to direct optical fiber from the upper right side of organizer 40 to the channel between the two cylinders. These guide plates also support the back surface of splice tray 60. The back side of splice tray 60 is placed on guide members 96 and 97 between post 140 extending from base plate 42 to the right of cylinders 44 and 46 and posts 142 and 144 extending from the right edge of base plate 42. Each of these posts includes a lip portion adapted to extend over an edge of splice tray 60 to fix the spice tray into position in the right section of the organizer.

As shown in FIG. 3, one or more optical fibers or optical fiber ribbons 100 may enter organizer 40 through the channel between surface 87 of corner guide 86 and guide post 92 and traverse the passageway including channel 120 between side 50 and cylinder 44, channel 122 between cylinder 44 and guide members 59 and 96, channel 124 between cylinders 44 and 46, and channel 126 above cylinder 44 counter clockwise one or more times ending on the bottom side of guide tray 60. Similarly, an optical fiber 102 may enter organizer 40 through the channel between corner guide 89 and guide post 94 and traverses the passageway including channel 128 between side 52 and cylinder 46, channel 130 between cylinder 46 and guide members 84 and 97, channel 124 between cylinders 44 and 46, and channel 132 above cylinder 46 clockwise one or more times ending on the top side of guide tray 60. Channel 122 between cylinder 44 and guides 59 and 96 as well as the channel 130 between cylinder 46 and guides 84 and 97 are both considerably wider than the channels between the cylinders and the channels between each cylinder and the adjacent sidewalls. These wide channels permit loops of slack optical fiber of varying lengths around each cylinder all of which are held within the minimum bend radius requirement of the fiber by the cylinder.

The looping arrangement shown with respect to optical fibers 100 and 102 in FIG. 3 where one fiber 100 is looped counter clockwise around cylinder 44 and another fiber 102 is looped clockwise around cylinder 46 is adequate where optical fiber 100 is obtained from a cable entering the top of enclosure 12 and optical fiber 102 is obtained from a cable entering the bottom of enclosure 12. Both fibers, however, may originate in cables entering the top of enclosure 12 and follow the same path in organizer 40. In this event, it is necessary to reverse the path of one fiber so that each fiber is available for splicing at opposite sides of splice tray 60. This is accomplished in organizer 40 by providing an S shaped or figure eight passageway around cylinders 44 and 46 for one fiber and a circular passageway around one or both of cylinders 44 and 46 for the other fiber. The passageways for optical fiber are described further with respect to FIGS. 7 and 8. The width of channels 122 and 130 permit varying length loops of both circularly wound and figure eight wound fibers. Cylinders 44 and 46, however, restrict the bend radius of the fibers to prevent damage or adverse transmission characteristic effects.

Figure 4:
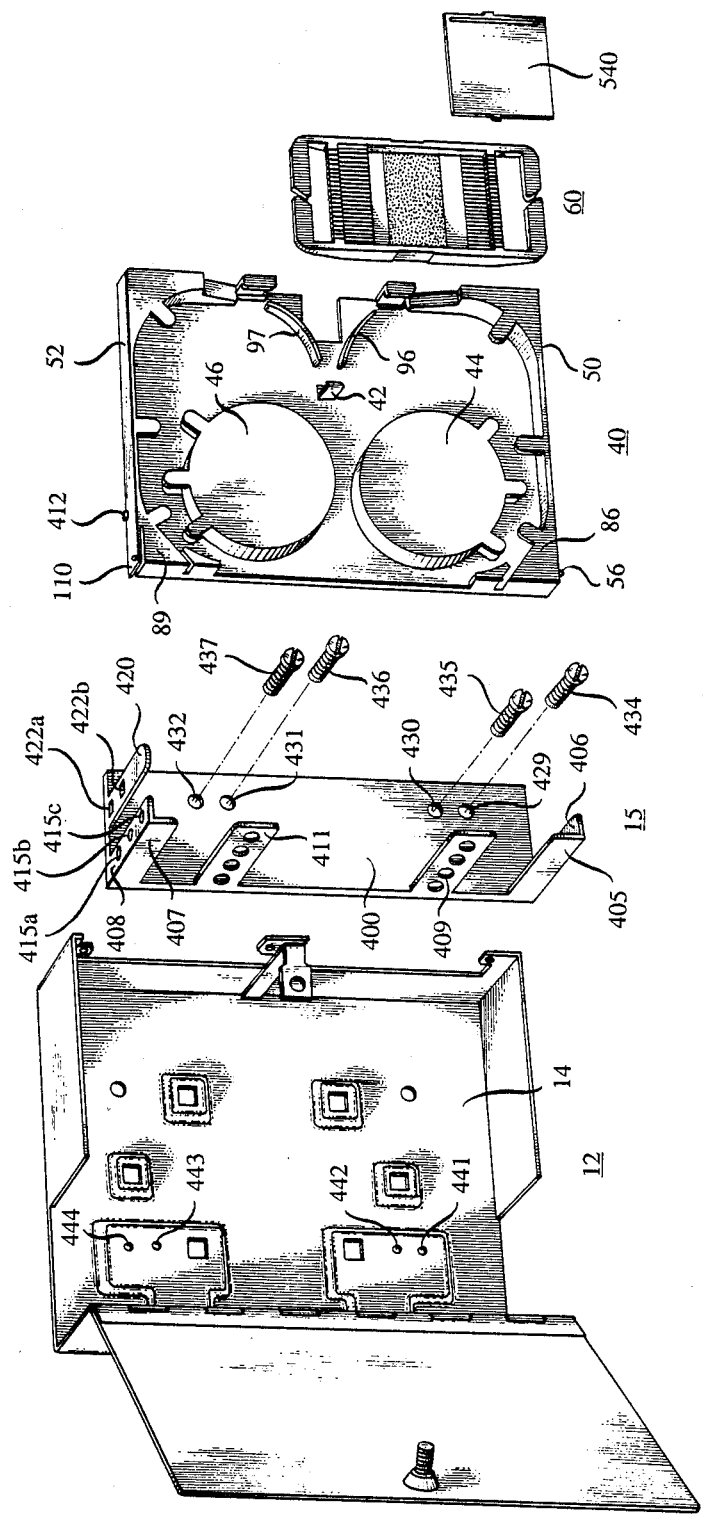
FIG. 4 is an exploded front perspective view of the housing, the organizer support structure and the organizer of FIG. 1 illustrating the assembly of the device of FIG. 1.

As aforementioned with respect to FIG. 1, enclosure 12 includes organizer support 15 adapted to fixedly retain a plurality of organizers 40 in stacked relationship within the enclosure. FIG. 4 is an exploded view of the device of FIG. 1 showing the relationships between organizer support 15, enclosure 12, and organizer 40. Support structure 15 in FIG. 4 comprises a pair of corner brackets 405 and 407 at either end of transverse plate 400. Machine screws 434, 435, 436 and 437 are passed through apertures 429, 430, 431 and 432 respectively, in transverse member 400 and are threaded into threaded holes 441, 442, 443 and 444 of enclosure base 14 to fasten the support structure 15 to plate 14 of the enclosure.

Corner bracket 407 has spaced apertures 415a, 415b and 415c in bracket side 408. Similarly, Corner bracket 405 has spaced apertures (not shown) similarly placed in bracket side 406. End pin 56 on sidewall 50 of organizer 40 and end pin 58 on sidewall 52 of the organizer shown in FIG. 3 are inserted into corresponding height apertures of the corner brackets e.g. aperture 415a on bracket 408 and aperture 417a on bracket 405. End pin 56 projects from corner section 86 in sidewall 50 of organizer 40 while end pin 58 projects from separated portion 110 of corner section 89. To attach an organizer 40 to organizer support structure 15, end pin 58 is inserted into aperture 415a and side 52 is pressed against corner bracket 407 to compress separated section 110 against the other portion of corner section 89. End pin 56 is then inserted into an aperture in bracket side 406 at the same height as aperture 415a of corner bracket 405. After insertion of the end pins, organizer 40 is pivotally attached to structure 15.

Sidewall 52 of the organizer includes a rectangular projection 412 and holding structure 15 has a post 420 extending from the top edge of transverse member 400 with rectangular apertures 422a and 422b therein. When organizer 40 is pivoted so that its base 42 is parallel to enclosure base 14, rectangular projection 412 is inserted into aperture 422a and organizer 40 is locked in position on enclosure 12. Another organizer may be placed outward from the first inserted organizer in enclosure 12 by inserting its end pins into aperture 415b on bracket 408 and the corresponding height aperture on bracket 405 and pivoting the other organizer so that its base is parallel to enclosure base 14. Rectangular projection 412 of the other organizer is thereby inserted into aperture 422b to lock the other organizer into position outward from the first inserted organizer. In FIG. 4, Organizer 40 may be made of fire retardant polycarbonate by molding processes well known in the art or from other suitable plastic materials. Support structure 15 may also be made of fire retardant polycarbonate or other plastic and housing 12 may be made of aluminum or other suitable metal by well known methods.

Figure 5:
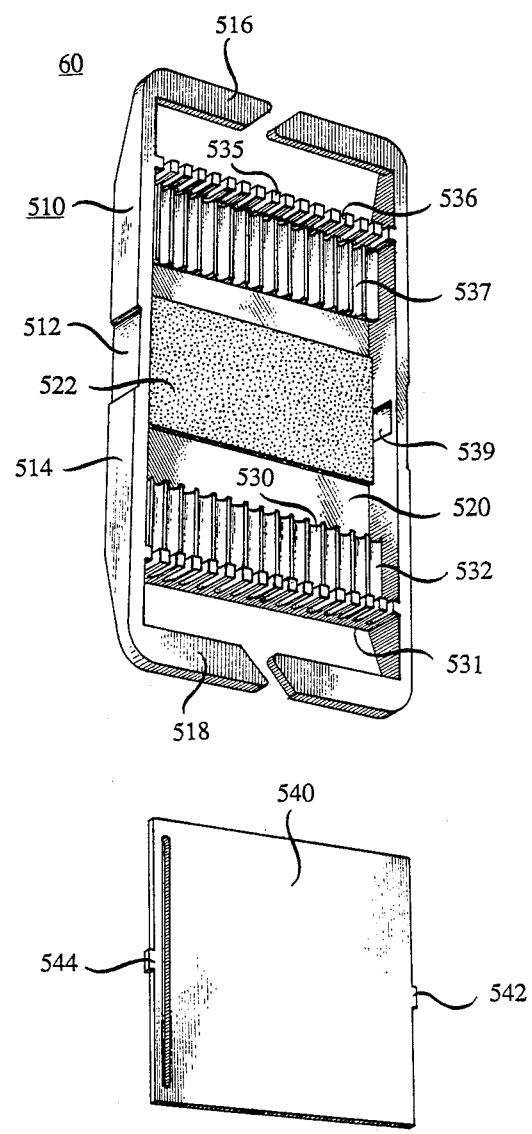
FIG. 5 is a front perspective view of the splice tray of FIG. 1.

FIG. 5 shows a perspective view of splice tray 60 of FIG. 1. taken from the left front and cover plate 540 of the splice tray. Referring to FIG. 5, the splice tray comprises frame 510, back plate 520 and grooved strip sections 530 and 535. Side 512 of frame 510 has a rectangular aperture 539 therein adapted to receive rectangular projection 542 of splice cover plate 540 and side 514 of the frame has a rectangular recess not shown for receiving rectangular projection 544. Each of opposite optical fiber sides 516 and 518 of the frame has a diagonal cut therein through which optical fibers may pass for splicing. Lower strip 530 between frame sides 510 and 512 has grooves 531 which may be V shaped to receive optical fibers and ridges 532 upon which individual fibers rest. Upper strip 535 also has grooves 536 adapted to receive optical fibers and ridges 537 upon which individual fibers rest. Back plate 520 includes a centrally located magnetized section 522 shown stippled. An optical fiber end is passed into the central portion of splice tray 60 through a groove e.g. groove 531 and the end of another optical fiber is passed into the splice tray through a corresponding groove e.g. 536. The fiber ends are spliced by means of one of the many well known fusion type splicing devices which are held in place by magnetic section 522 of splice tray bottom 520. It is to be understood that other arrangements well known in the art for attaching splice devices to splice tray 60 may also be used.

Figure 6:
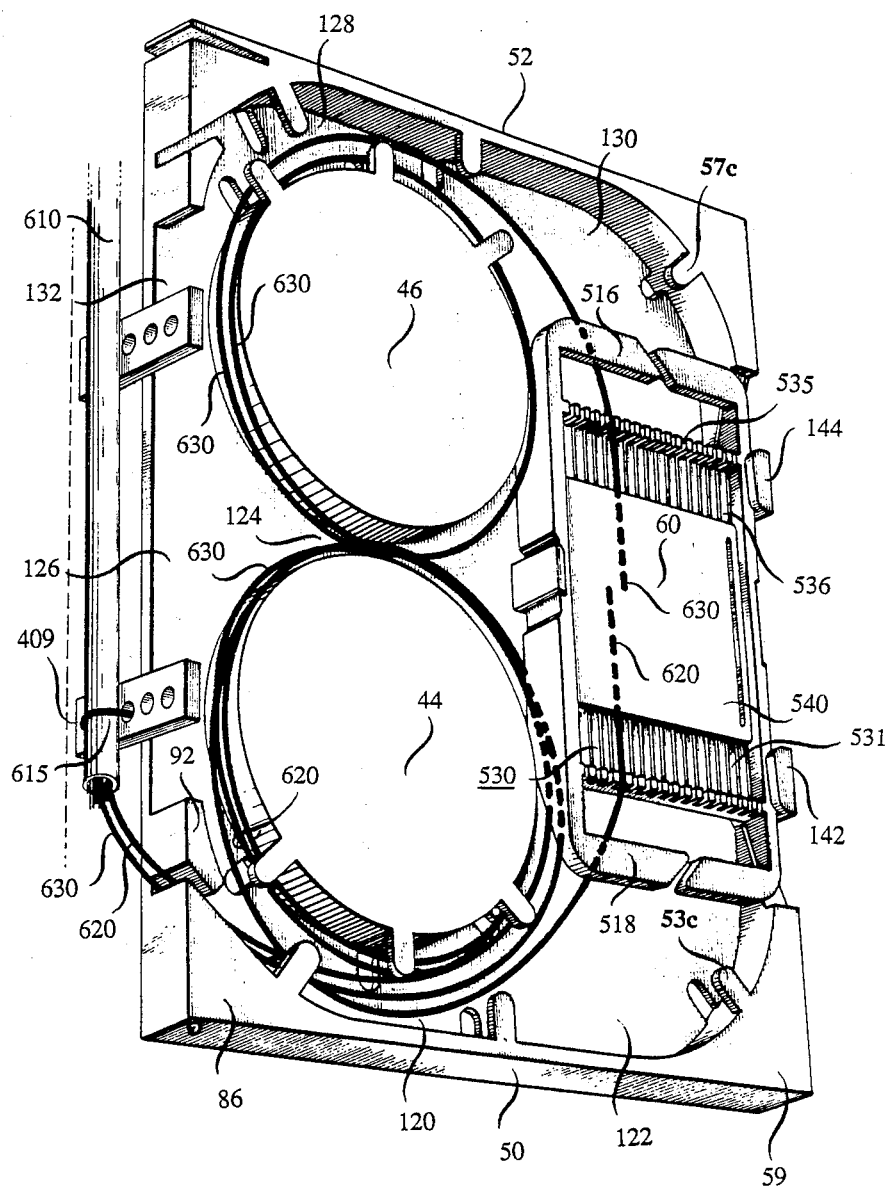
FIGS. 6 and 7 are front perspective views of the device of FIG. 1 showing the placement of optical fiber cable and fibers separated therefrom

FIG. 6 shows a front perspective view of organizer 40 of the device of FIG. 1 with a fiber optic cable 610 placed therein. Enclosure 12 is fixed in place and holding structure 15 is then attached to plate 14 of the enclosure as described with respect to FIG. 4. An organizer 40 is pivotally mounted and locked in place as previously described. Cable 610 is then passed into the cable channel between the left side 28 of the enclosure (not shown) and cable tying post 409 from the top of the channel. Cable 610 is affixed to cable tying post 409 by cable tie 615 and the optical fibers 620 and 630 to be spliced in organizer 40 are separated from the cable. These optical fibers enter organizer 40 via the channel between post 92 and corner extension 86 of the organizer sidewall 50.

Assume for purposes of illustration that optical fiber 620 from cable 610 is to be spliced to optical fiber 630 from the same cable. Both optical fibers 620 and 630 are separated from the cable and are directed into the organizer through the fiber channel between corner 86 and post 92. Fibers 620 and 630 pass along the passageway including channels 120, 122, 124, and 126. Fiber 620 is loosely looped in a counter clockwise direction around cylinder 44 one or more times and under tray 60. Its free end is inserted into grove 531 of lower strip section 530 of the splice tray. Fiber 630 is looped in a counter clockwise direction around cylinder 44 one or more times, then passed through channel 124 between cylinders 44 and 46 and directed in a clockwise direction around cylinder 46. The direction of optical fiber 630 is thereby changed from counter clockwise without violating bend radius restrictions. The free end of fiber 630 is then enters splice tray 60 through groove 536 in upper grooved strip 535. In this way, a pair of optical fibers from one cable or a pair of cables entering the enclosure from one side thereof are directed to opposite entrance sides of splice tray 60 so that optical fiber routing does not violate the minimum bend radius restriction.

Figure 7:
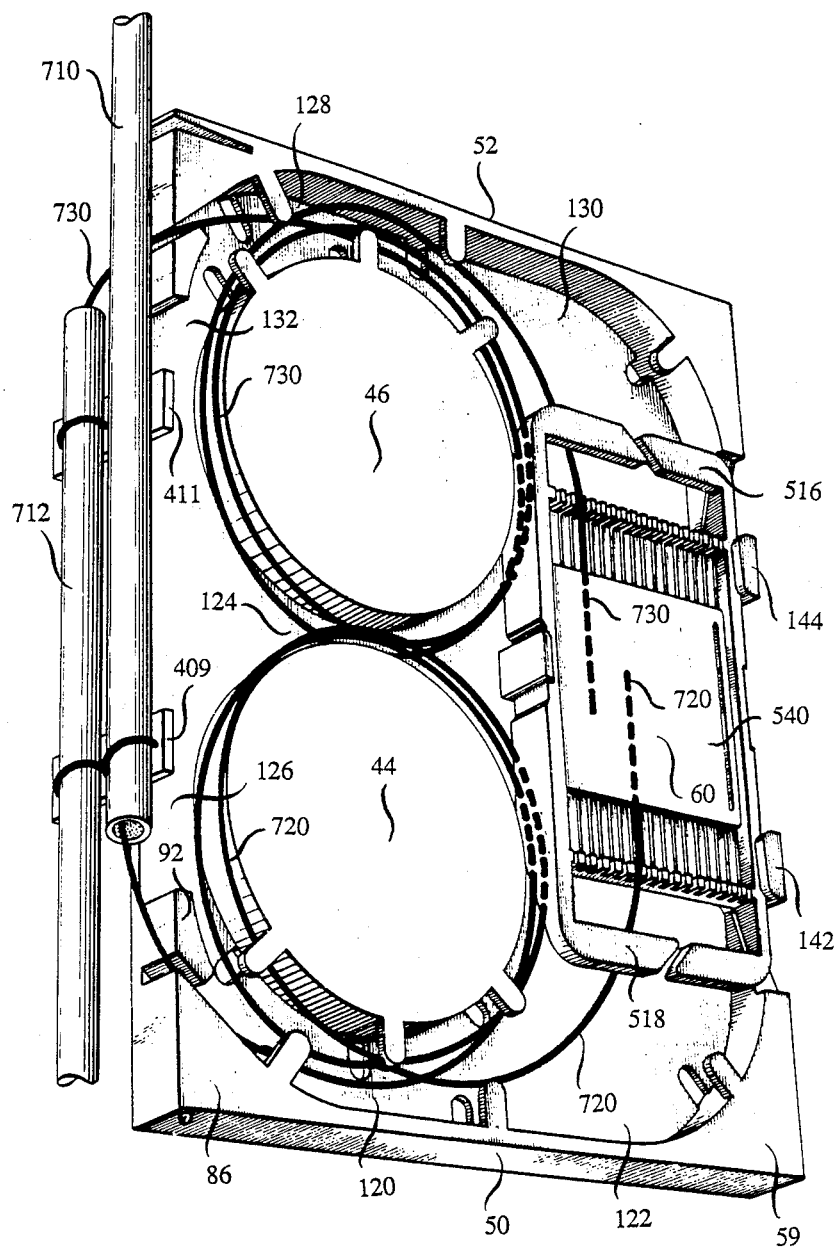

FIG. 7 illustrates the placement of slack fiber loop in organizer 40 when an optical fiber 720 from cable 710 entering the enclosure from the bottom is to be spliced to an optical fiber 730 from cable 712 entering the enclosure from the top Fiber 720 separated from cable 710 is looped counter clockwise around cylinder 44 or cylinders 44 and 46 one or more times to form a slack fiber loop that is under tray 60. Fiber 730 separated from cable 612 is looped around cylinder 46 or cylinders 46 and 44 under tray 60 one or more times in a clockwise direction. The free end of fiber 720 is inserted into splicing tray 60 through lower frame entrance side 518 and the free end of fiber 730 is inserted into splicing tray 60 through upper frame entrance side 516 so that the two ends may be spiced without violating the minimum bend radius restriction.

The invention has been described with reference to an illustrative embodiment thereof. It is to be understood, however, that various modifications and changes may be made by one skilled in the art without departing from the spirit and scope of the invention.

What is claimed is:

1. A device for organizing optical fibers separated from at least one optical fiber cable comprising:
    a rectangular base plate of prescribed width and length divided along its width into first and second rectangular sections;
    sidewalls on the opposite edges along the width of the rectangular base plate; and
    an optical fiber splice tray having a pair of opposite entrance sides for optical fiber ends;
    the first rectangular section of the base plate comprising first and second cylinders extending outward a predetermined distance from the base plate, each cylinder having a diameter greater than twice the minimum bend radius of the separated optical fiber and being spaced from the other cylinder, from the sidewall adjacent thereto and from the edge of the rectangular base plate along the length of the first rectangular sections;
    the second rectangular section of the base plate comprising means for mounting the optical fiber splice tray a predetermined distance from the base plate to form a channel for separated optical fibers between said base plate and the splice tray;
    the at least one optical fiber cable running substantially parallel to the edge of the first section of the rectangular base plate along its length;
    the space between the first cylinder and the sidewall adjacent thereto in the first rectangular section forming a first channel having an entrance at the edge of the rectangular base plate along its length for receiving a plurality of optical fibers separated from the at least one optical fiber cable running substantially parallel to the edge of the first rectangular section along its length,
    a first passageway for directing at least one optical fiber separated from the at least one optical fiber cable running parallel to the length of the first rectangular section from the entrance of the first channel to one entrance side of the optical fiber splice tray, said first passageway guiding the at least one optical fiber at least around the first cylinder in a first direction through the first channel, the channel formed by the space between the first and second cylinders and the channel between the base plate and the splice tray in variable length loops each exceeding the minimum bend radius of the separated optical fiber, and
    a second passageway for directing at least one other optical fiber separated from the at least one optical fiber cable running parallel to the length of the first rectangular section from the entrance of the first channel to the other entrance side of the optical fiber splice tray, said second passageway guiding the at least one other optical fiber at least around the first cylinder in a first direction and around the second cylinder in a second direction opposite the first direction through the first channel, the channel formed by the space between the first and second cylinders, the channel formed by the space between the second cylinder and the sidewall adjacent thereto and the channel between the base plate and the splice tray in variable length loops each exceeding the minimum bend radius of the optical fiber.

2. A device for organizing optical fibers separated from at least one optical fiber cable according to claim 1 wherein:
    the first passageway includes
    one or more loops for the separated one optical fiber running counterclockwise around the first cylinder; and
    the second passageway includes at least one loop for the other separated optical fiber running counterclockwise around the first cylinder and at least one loop for the other separated optical fiber running clockwise around the second cylinder.

3. A device for organizing optical fibers separated from at least one optical fiber cable according to claim 1 wherein the means for mounting said optical fiber splice tray a predetermined distance from the base plate to form a channel for the separated optical fibers between said base plate and the splice tray comprises a pair of posts for maintaining the splice tray at said predetermined distance, each post having a curved surface perpendicular to the base plate for guiding optical fiber in said second rectangular section into the channel formed by the space between the first and second cylinders in said first rectangular section.

4. A device for organizing optical fibers separated from at least one optical fiber cable according to claim 1 wherein
    each sidewall includes a corner extension at each end;
    each corner extension having a concave curved surface perpendicular to the base plate for channeling optical fiber around the corner within the rectangular base plate without exceeding the minimum bend radius of the fiber.

5. A device for organizing optical fibers separated from at least one optical fiber cable according to claim 1, 2, 3 or 4 wherein said device is made of molded plastic.

6. A device for organizing optical fibers separated from at least one optical fiber cables according to claim 1 wherein the space between the second cylinder and the sidewall adjacent thereto in the first rectangular section forms a second channel having an entrance at the edge of the rectangular base plate along its length for receiving at least one optical fiber separated from the at least one optical fiber cable running substantially parallel to the edge of the first rectangular section of the base plate along its length, and further comprising a third passageway for directing at least one optical fiber separated from the at least one optical fiber cable running parallel to the length of the first rectangular section from the entrance of the second channel to one entrance side of the optical fiber splice tray, said third passageway guiding the at least one optical fiber at least around the second cylinder in the second direction including the second channel, the channel formed by the space between the first and second cylinders and the channel between the base plate and the splice tray in variable length loops each exceeding the minimum bend radius of the optical fiber, and a fourth passageway for directing at least one other optical fiber separated from the at least one optical fiber cable running parallel to the length of the first rectangular section from the entrance of the second channel to the other entrance side of the optical fiber splice tray, said fourth passageway guiding the other optical fiber at least around the second cylinder in the second direction and around the first cylinder in the first direction including the second channel, the channel formed by the space between the first and second cylinders, the first channel and the channel between the base plate and the splice tray in variable length loops each exceeding the minimum bend radius of the optical fiber.

7. A device for interconnecting optical fibers separated from at least one sheathed optical fiber cable comprising:

at least one optical fiber organizer;

at least one optical fiber splice tray having opposite optical fiber entrance sides;

a housing for enclosing said at least one optical fiber organizer having a base plate, sidewalls and a cover plate;

a structure for supporting said at least one optical fiber organizer within said housing having a transverse member attached to the base plate of said housing and a pair of brackets extending along the housing sidewalls at the ends of said transverse member in said housing;

said at least one optical fiber organizer in said support structure comprising a rectangular base plate of prescribed width and length divided along its width into first and second rectangular sections, and sidewalls on the opposite edges along the width of the rectangular base plate of the organizer;

the first rectangular section of the organizer comprising first and second cylinders extending outward a predetermined distance from the rectangular organizer base plate, each cylinder having a diameter greater than twice the minimum bend radius of the optical fiber and being spaced from the other cylinder, from the sidewall adjacent thereto, and from the edge of the rectangular organizer base plate along the length of the first rectangular section;

the second rectangular section of the organizer comprising means for mounting the optical fiber splice tray a predetermined distance from said organizer base plate to form at least one channel for optical fibers separated from the at least one sheathed optical fiber cable between the base plate and the optical fiber splice tray;

the at least one sheathed optical fiber cable running between the edge of the first rectangular section of the organizer base plate along its length and the sidewall of the housing adjacent thereto;

the space between the first cylinder and the organizer sidewall adjacent thereto in the first rectangular section forming a first channel having an entrance at the edge of the rectangular base plate along its length for receiving optical fibers separated from the at least one sheathed optical fiber cable running between the edge of the first rectangular section of the organizer base plate along its length and the sidewall of the housing adjacent thereto;

a first passageway for directing at least one optical fiber separated from the at least one sheathed optical fiber cable running parallel to the length of the first rectangular section of the organizer from the entrance of the first channel to one entrance side of the optical fiber splice tray, the first passageway guiding the one optical fiber at least around the first cylinder in a first direction including the first channel, the channel formed by the space between the first and second cylinders and the channel between the base plate and the splice tray in variable length loops each exceeding the minimum bend radius of the optical fiber, a second passageway for directing at least one other optical fiber separated from the at least one sheathed optical fiber cable running parallel to the length of the first section from the entrance of the first channel to the other entrance side of the optical fiber splice tray, said second passageway guiding the at least one other optical fiber at least around the first cylinder in the first direction and around the second cylinder in a second direction including the first channel, the channel formed by the space between the first and second cylinders, the channel formed by the space between the second cylinder and the sidewall adjacent thereto and the channel between the base plate and the splice tray in variable length loops each exceeding the minimum bend radius of the optical fiber.

8. A device for interconnecting optical fibers separated from at least one sheathed optical fiber cable according to claim wherein the first passageway of at least one organizer comprises one or more loops for the at least one optical fiber running clockwise around the first cylinder; and the second passageway includes at least one loop for the at least one other optical fiber running counterclockwise around the first cylinder and at least one loop for the other optical fiber running clockwise around the second cylinder.

* * * * *

UNITED STATES PATENT AND TRADEMARK OFFICE
CERTIFICATE OF CORRECTION

PATENT NO. : 4,840,449

DATED : June 20, 1989

INVENTOR(S) : Shahryar Ghandeharizadeh

It is certified that error appears in the above—identified patent and that said Letters Patent is hereby corrected as shown below:

Column 1, line 27, before "discloses" insert --issued May 12, 1981 to Hutchins et al--.

Column 2, line 19, after "fibers" delete "in"; line 33, after "therefrom" insert period.

Column 3, line 13, after "then" delete "be"; line 49, after "53a" delete comma; line 52, change "Spaced" to --spaced--; line 54, after "57a" delete comma.

Column 5, line 47, change "Corner" to --corner--; line 52, after "brackets" insert comma; line 52, after "e.g." insert comma.

Column 6, line 12, change "Organizer" to --organizer--; line 20, after "FIG. 1" delete period; line 38, after "groove" insert comma, line 38, after "e.g." insert comma; line 40, after "groove" insert comma; line 40, after "e.g." insert comma; line 60, after "86 of" delete "the".

Column 7, line 10, after "630" delete "is"; line 21, after "top" insert period; line 31, change "spiced" to --spliced--; line 56, change "sections" to --section--.

Column 9, line 2, change "claim" to --claims--; line 6, change "cables" to --cable--.

Column 10, line 57, after "claim" insert --7--; line 60, change "clockwise" to --counterclockwise--.

Signed and Sealed this

Twelfth Day of June, 1990

Attest:

HARRY F. MANBECK, JR.

*Attesting Officer*  *Commissioner of Patents and Trademarks*